US006811694B2

(12) United States Patent
Jainek

(10) Patent No.: US 6,811,694 B2
(45) Date of Patent: Nov. 2, 2004

(54) LIQUID FILTER

(75) Inventor: Herbert Jainek, Heilbronn (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/361,003

(22) Filed: Feb. 10, 2003

(65) Prior Publication Data

US 2003/0168390 A1 Sep. 11, 2003

Related U.S. Application Data

(63) Continuation of application No. PCT/EP01/08589, filed on Jul. 25, 2001.

(30) Foreign Application Priority Data

Aug. 8, 2000 (DE) .......................................... 100 38 531

(51) Int. Cl.[7] ................................................ B01D 35/16
(52) U.S. Cl. ....................... 210/248; 210/428; 210/429; 210/434; 210/440; 210/457
(58) Field of Search ................................ 210/248, 428, 210/429, 433.1, 434, 437, 438, 440, 457; 137/315.27, 625.29, 625.34; 251/324, 904

(56) References Cited

U.S. PATENT DOCUMENTS 5,098,559 A * 3/1992 Mack et al. ................. 210/130
5,468,386 A * 11/1995 Ardes .......................... 210/248

FOREIGN PATENT DOCUMENTS

| DE | 4303695 | 8/1994 | |
|----|---------|--------|----|
| DE | 29610290 | 10/1996 | |
| DE | 29915840 | 3/2001 | |
| DE | 29921543 | 5/2001 | |
| EP | 0612549 | 5/1996 | |
| EP | 0848978 | 9/1999 | |
| JP | 09010515 A | * 1/1997 | ........... B01D/27/08 |

* cited by examiner

Primary Examiner—Matthew O. Savage
(74) Attorney, Agent, or Firm—Crowell & Moring LLP

(57) ABSTRACT

A liquid filter for removing contaminants from liquids such as lubricating oil, water or fuel, comprising a filter housing (10), a filter element (15), a support body (16) and a slide valve (17), which, when closed, prevents liquid from flowing from an unfiltered liquid area or from a filtered liquid area to a filter outlet (24). When the filter housing is opened, the slide valve moves axially and opens the filter outlet (24) so that the filter housing can empty. The slide valve (17) is detachably snapped together with the support body (16), which in turn is connected to a housing cover (12). This enables the slide valve to be detached from the support body, and reduces the level of maintenance required by the liquid filter.

7 Claims, 5 Drawing Sheets

LIQUID FILTER

CROSS REFERENCE TO RELATED APPLICATIONS

This application is a continuation of international patent application no. PCT/EP01/08589, filed Jul. 25, 2001 designating the United States of America, and published in German as WO 02/11854, the entire disclosure of which is incorporated herein by reference. Priority is claimed based on Federal Republic of Germany patent application no. DE 100 38 531.1, filed Aug. 8, 2000.

BACKGROUND OF THE INVENTION

The present invention relates to a liquid filter for removing contaminants from a liquid such as lubricating oil, water or fuel.

An oil filter for filtering lubricating oil is known from German Patent 43 03 695 in which a cover, onto which an annular filter insert which separates the outer feed chamber from the inner discharge chamber is removably attached, is screwed on to the filter housing, which is positioned substantially vertically, of the oil filter for filtering lubricant oil. A valve-like element, which opens automatically every time the filter insert is changed and is used to drain the oil remaining in the filter housing via a drain channel to an oil collection chamber, is provided in the lower region of the filter housing.

A central rod is connected to the cover so it is rotatable and axially movable in a limited way. In its region near the cover, the central rod has a piston-like enlargement, which is sealed relative to the filter insert and separates the feed chamber from the discharge chamber. The central rod includes the valve-like element, which works together with the drain channel, in its lower end region.

The length of the central rod, which reaches from the cover through the oil filter to the drain channel in the floor of the filter housing, is disadvantageous in this embodiment. When the filter is replaced, the cover is unscrewed from the filter housing and must be pulled upward in the axial direction until the central rod is removed from the filter housing. A substantial maintenance height is necessary for this purpose. After the cover having the central rod and the filter insert is pulled out of the filter housing, the used filter insert must be removed from the cover. For this purpose, the soiled filter insert must be pulled off over the long central rod and the new filter insert must be pushed onto the long central rod in turn, while the central rod is able to move at an angle to the cover in the region of its snap connection to the cover. Furthermore, there is the danger that the long central rod or its gaskets could be damaged while the filter is replaced.

SUMMARY OF THE INVENTION

The object of the present invention is to avoid the disadvantages cited above.

This object is achieved by the invention as described and claimed hereinafter.

The liquid filter according to the present invention comprises a filter housing, a filter element, a support body for the filter element, and a slide valve. It is used to filter a liquid such as lubricant oil of an internal combustion engine, water, or fuel. The filter housing comprises a housing body and a housing cover, the housing cover being connected to the housing body to form a seal. In this case, sealing means which are inserted between the housing cover and the housing body may be provided. The housing parts (housing cover and housing body) are detachably connected to one another. An advantageous embodiment is to screw the housing parts together. An unfiltered liquid inlet, a filtered liquid outlet, and an unpressurized filter outlet are arranged in the filter housing, particularly in the housing body. The unfiltered liquid inlet is separated by the filter element from the filtered liquid outlet, which forms a seal between them. The filter element is designed in such a way that it defines a filter interior space. The filter interior space may be made cylindrical or in the form of a rectangular solid, for example, and has two opposing openings. A support body is positioned in the filter interior space, supporting the filter element through which the liquid flows from the outside to the inside. The support body may be fixedly connected to the filter element or loosely inserted into the filter element, for example.

The filter outlet is closed by a slide valve, which is connected to the housing cover via an intermediate element, such as a connecting member or the support body, so they correspond. When the filter element has to be replaced, the housing cover is lifted off of the housing body, as a result of which the slide valve is moved axially and opens the unpressurized filter outlet. The liquid in the filtered liquid area of the liquid filter may drain out through the liquid outlet. Furthermore, the filter outlet may be correspondingly connected to the unfiltered liquid inlet such that this connection advantageously can also be established or interrupted by the slide valve. Therefore, in an advantageous embodiment of the liquid filter, the unfiltered liquid may drain into the liquid outlet before the filtered liquid reaches the liquid outlet, as a result of which no unfiltered liquid reaches the filtered side even during filter replacement, and therefore no contaminant particles may accumulate in the filtered liquid area.

In a first variant, the slide valve may be detachably connected to the support body. The support body is correspondingly connected to the housing cover and is inserted into the filter element. In this case, the support body may be detachably or permanently connected to the housing cover, for example. However, if there is a detachable connection between the housing cover and the support body, this connection has to be able to withstand greater axial forces than the detachable connection between the support body and the slide valve.

In a second variant, the slide valve is detachably connected to a connecting member, which in turn is either detachably or permanently connected to the housing cover. In this case, the detachable connection between the connecting member and housing cover must be designed in accordance with the connection between the housing cover and the support body of the first variant.

As a result of the connection of the slide valve to the support body or the connecting member, the assembly comprised of the housing cover, the slide valve, and the support body or the connecting member can be separated so that less space is required for maintenance. This is advantageous in motor vehicles, for example, since therefore the liquid filter may also be positioned at locations which are less readily accessible.

One advantageous embodiment of the connection between the slide valve and the support body or the connecting member is a snap connection, which can be established as many times as desired. Furthermore, a snap connection is a connection which is simple and rapid to produce, and which may also be disconnected simply and rapidly.

A particularly advantageous embodiment of the snap connection comprises a spherical head which may be snapped into a corresponding socket. In this case, the spherical head may be positioned either on the slide valve or on the support body or connecting member. This embodiment has the advantage that the snap connection centers itself and may snap in during mounting when the slide valve is in any position or orientation relative to the support body or connecting member.

In a refinement of the liquid filter, the slide valve is attached to the housing body so as to be axially displaceable. In this case, the slide valve remains in the housing body during replacement of the filter element. The connection between the slide valve and the support body or connecting member is released, so that the housing cover and the support body or connecting member form a relatively short unit, which may be removed from the housing body in a small space. The slide valve may, for example, be locked in the housing body by a catch, due to which it is easy to install but cannot be removed non-destructively after installation. All components of the slide valve, such as the snap connection, sealing surfaces, or gaskets, are designed as components which are good for the service life of the valve, so that no maintenance is necessary. In this way, damage to the sealing surfaces of the slide valve, for example, may be avoided.

It is advantageous if the slide valve has a centering region, which is guided in the housing body. Because of this, the slide valve cannot tilt and cause a leakage flow. Furthermore, the slide valve remains in its position after separation from the support body and/or connecting member, due to which this connection may be produced again easily. The centering region may, for example, be formed by three ribs, which are supported against the housing body and do not impede drainage of the liquid into the liquid outlet. Furthermore, the centering region may also be constructed as a perforated disk, which is also permeable to the liquid.

In one advantageous embodiment of the present invention, the centering region is guided in the housing body in such a way that the slide valve is held by a clamping force during filter replacement. Because of this, the slide valve remains in its disengaged final position, in which the liquid may drain.

In accordance with a further embodiment of the present invention, the slide valve has two sealing regions, the filtered liquid area being separated from the filter outlet by the first sealing region and the unfiltered liquid inlet being separated from the filter outlet by the second sealing region. It is advantageous in this case if, when the liquid filter is opened, the second sealing region first opens the unfiltered liquid area to the filter outlet, so that the contaminated liquid may drain first. As the liquid filter is opened further, the slide valve is displaced further, so that the filtered liquid may also drain into the filter outlet. In this way, nearly all of the liquid may drain out of the liquid filter when the filter element is to be changed.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
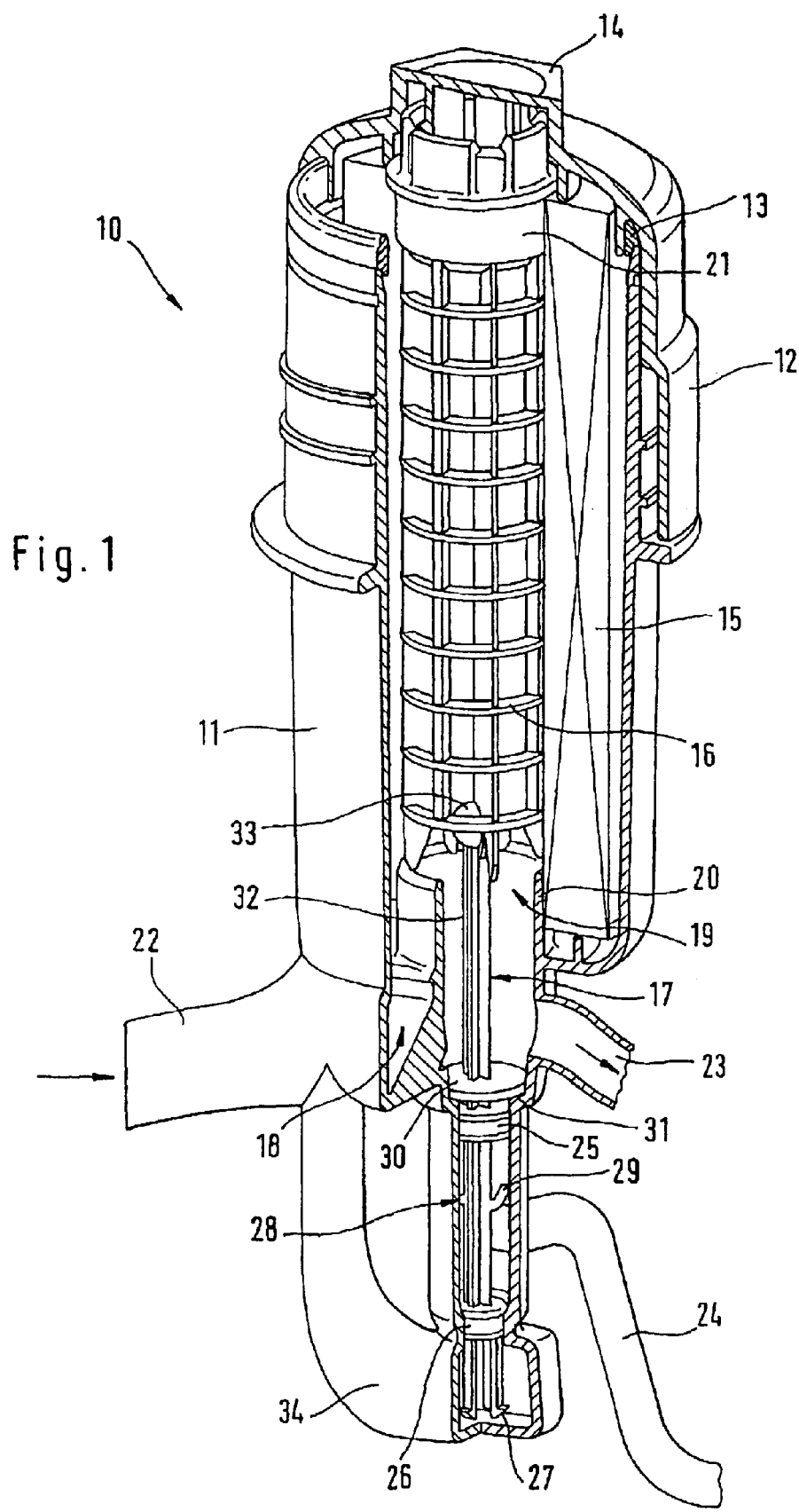
FIG. 1 shows a liquid filter in partial section.

FIG. 1 shows a partial section view of a liquid filter according to the invention. The liquid filter comprises a filter housing 10, which is formed by a housing body 11 and housing cover 12. The housing cover 12 is screwed together with the housing body 11 to form a seal, a sealing means 13 being provided between the housing body 11 and the housing cover 12. The housing cover 12 has a hexagonal projection 14 on the outside, by means of which the housing cover 12 may be screwed tightly onto the housing body 11. A filter element 15, a support body 16, and a slide valve 17 are positioned in the filter housing 10. The filter element 15 is introduced into the filter housing 10 in such a way that an unfiltered liquid area 18 is separated from a filtered liquid area 19 by a seal. For this purpose, the hollow cylindrical filter element 15 is supported at one end on a tubular projection 20 in the housing body 11 and at its other end on a sealing projection 21 of the support body 16. The support body 16 is permeable to the liquid to be filtered, which is achieved in this illustrative embodiment by forming the support body as a lattice. A bypass valve, which short-circuits the unfiltered side 18 to the filtered side 19 in the event of too large a pressure increase in the liquid filter, may be positioned in the support body 16, for example.

The housing body 11 has an unfiltered liquid inlet 22, which is connected to the unfiltered liquid area 18. Furthermore, the housing body 11 has a filtered liquid outlet 23, through which filtered liquid may flow out of the filtered liquid area 19.

The slide valve 17 is arranged in the housing body 11 in such a way that in its first end position it closes a filter outlet 24, which is integrated into the housing body 11. Slide valve 17 comprises a first sealing region 25, which in this end position sealingly separates the filtered liquid area 19 from the filter outlet 24. A second sealing region 26 sealingly separates the unfiltered liquid area 18, which is connected via a connection line 34 to the liquid outlet 24, from the filter outlet 24. In order that the slide valve 17 is not removed from the housing body 11, a catch 27, which is locked into the housing body 11 during initial installation and then remains in the housing body 11, is positioned in the lower region of the slide valve 17. The catch 27 allows axial movement of the slide valve 17 within the housing body 11.

In order to prevent tipping of the slide valve 17, a centering region 28 is provided having centering ribs 29, which are guided in the housing body 11. The slide valve 17 has a shoulder 30, which presses against a bearing surface 31 and thus delimits the first end position. The individual components 27, 29, 30 of the slide valve 17 are connected by a rod 32, which has an X-shaped cross-section in this illustrative embodiment. The rod 32 has a spherical head 33 on its upper end, which is snapped together with a mating central socket on the support body 16.

Figure 2:
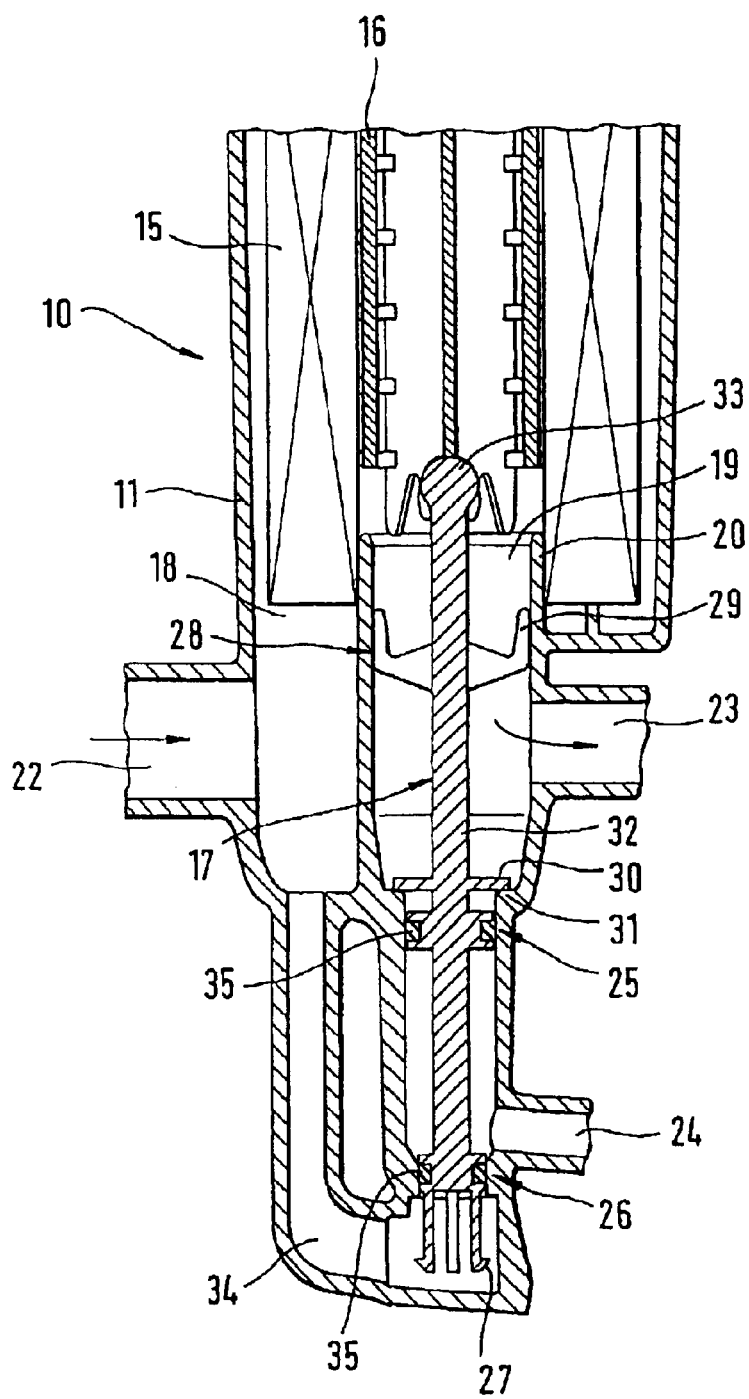
FIGS. 2, 3 and 4 show detail views of the liquid filter of FIG. 1 with the slide valve in different positions.

A detail of the liquid filter shown in FIG. 1 is illustrated in FIG. 2. The components corresponding to FIG. 1 are identified by the same reference numbers. In this sectional view, the slide valve 17 is in the first end position, so that unfiltered liquid entering the liquid filter in the direction of the arrow through inlet 22 is filtered by the filter element 15 and leaves again through the filtered liquid outlet 23. In this case, the liquid outlet 24 is sealed to both the filtered liquid and the unfiltered liquid by the first and the second sealing regions 25, 26. The sealing regions 25, 26 each have a seal 35, which encloses the respective sealing region 25 or 26.

Figure 3:
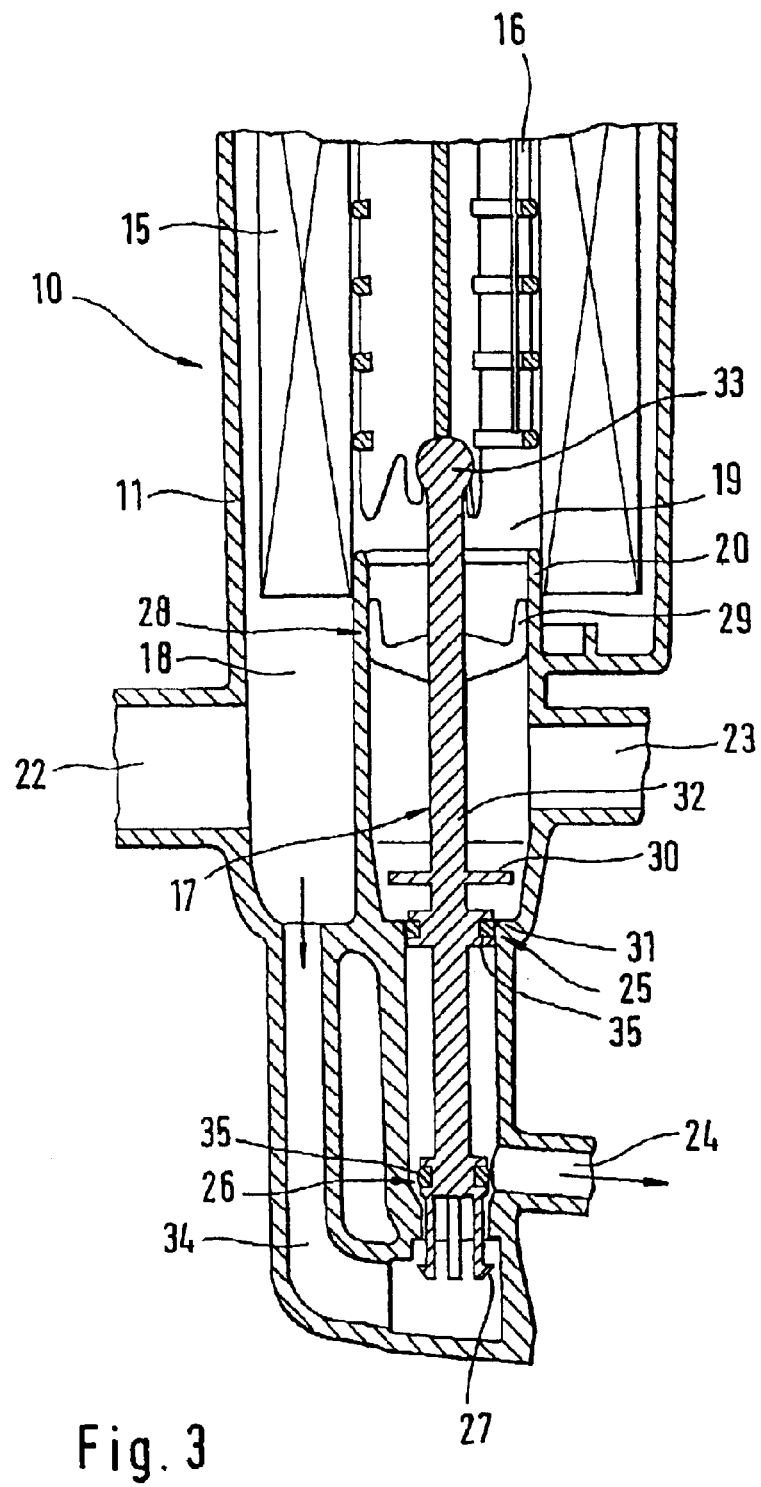

A detail of the liquid filter shown in FIG. 1 is illustrated in FIG. 3. The components corresponding to FIG. 2 are identified by the same reference numbers. In this illustration, the slide valve 17 is in an intermediate position, which is produced by partially opening the housing cover 12 (shown in FIG. 1). In this position, the slide valve 17 only still seals the filtered liquid area 19 from the filter outlet 24 using the first sealing region 25. The second sealing region 26 no longer seals, as a result of which unfiltered liquid may flow from the unfiltered liquid area 18 into the filter outlet 24. The liquid filter thus empties before the filter element 15 is completely removed and the unfiltered side 18 consequently is no longer separated from the filtered side 19.

Figure 4:
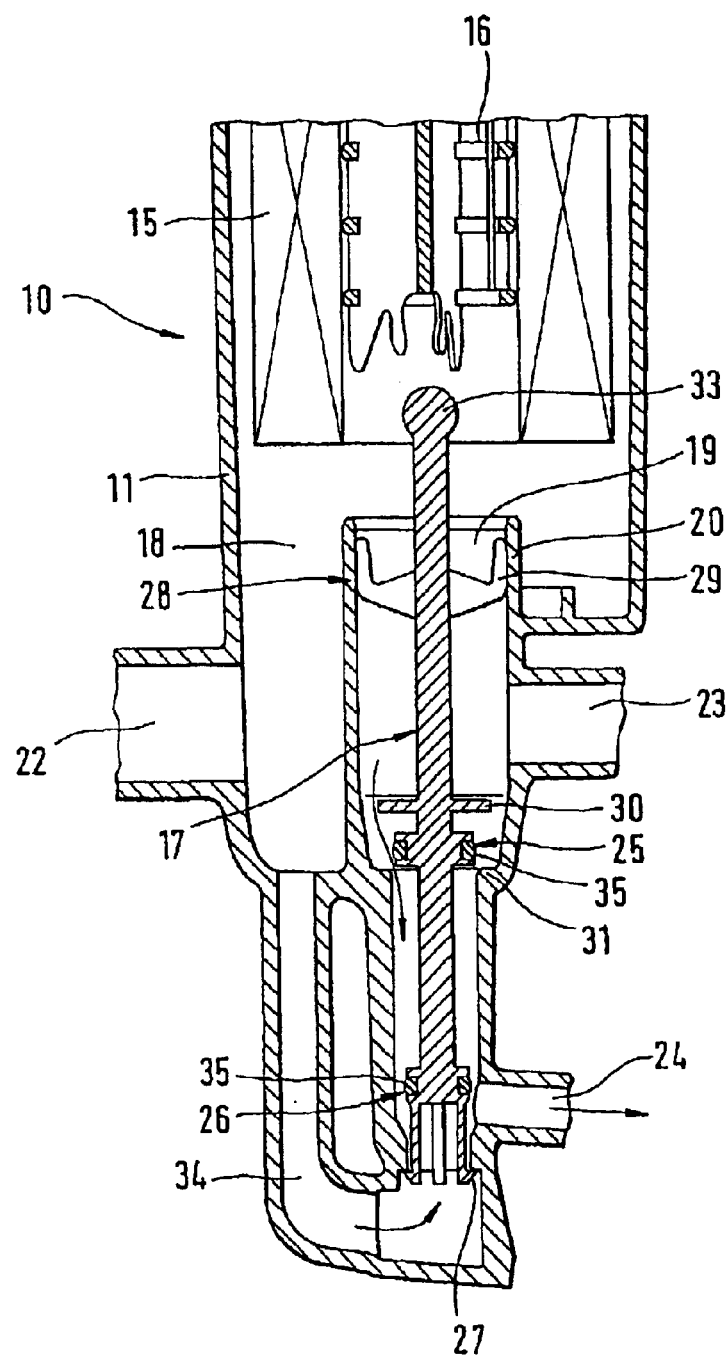

Another detail of the liquid filter shown in FIG. 1 is illustrated in FIG. 4. Again the components corresponding to FIG. 2 are identified by the same reference numbers. In this detail, the slide valve 17 is snapped out of the support body 16 and is therefore in its second end position. In this case, the catch 27 has prevented the slide valve 17 from being pulled further out of the housing body 11. In this position, the first sealing region 25 no longer seals the filtered liquid area 19 from the filter outlet 24, as a result of which the liquid backed up in the tubular projection 20 may drain into the filter outlet 24 without pressure. The centering region 28 supports the slide valve 17 so that it cannot tip. Furthermore, in combination with the tubular projection 20, the centering region 28 clamps the slide valve 17 so that it does not fall down into the first end position due to its weight.

Figure 5:
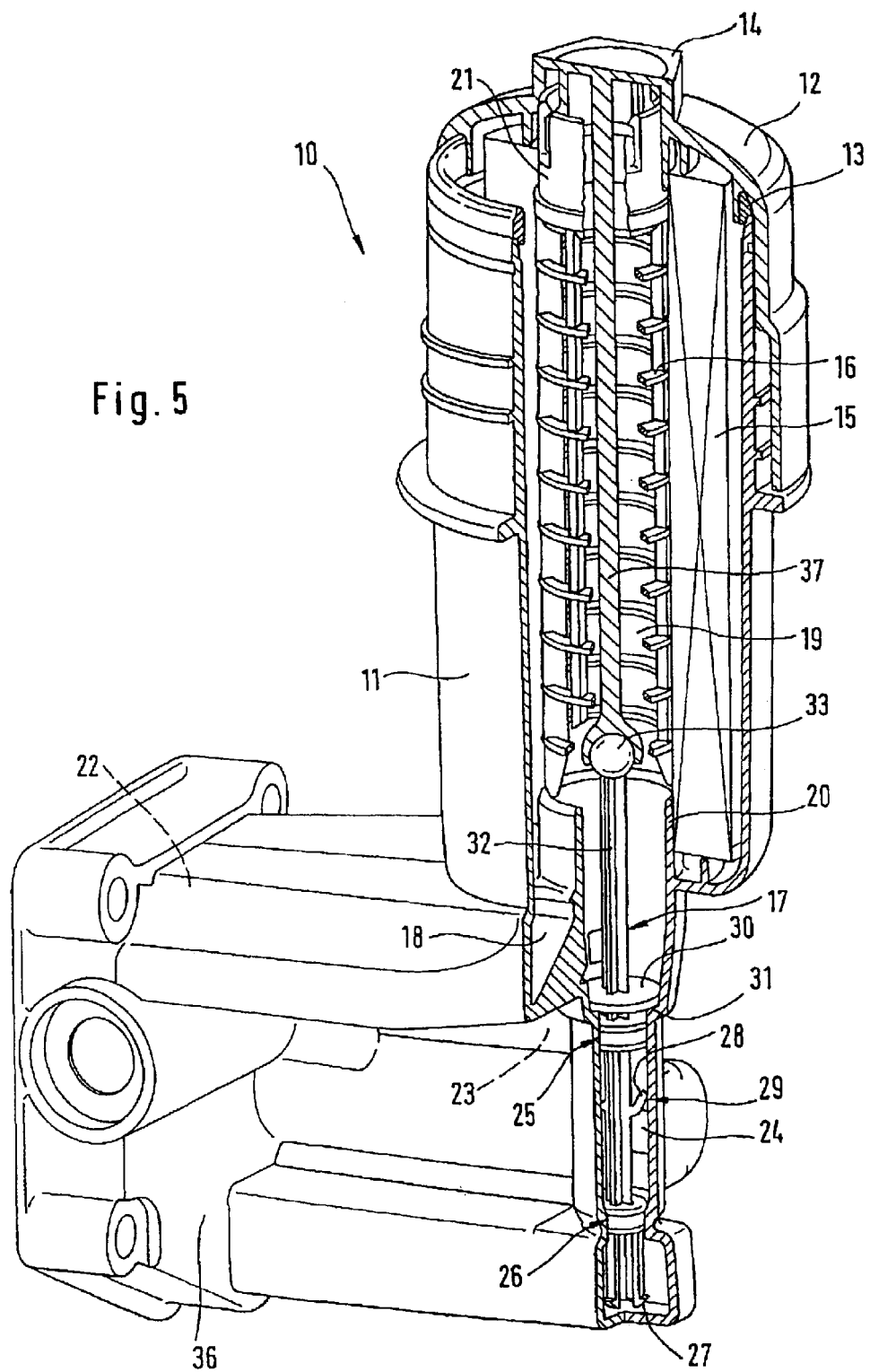
FIG. 5 shows an alternative liquid filter arrangement in partial section.

A variant of a liquid filter is shown in partial section in FIG. 5. Parts corresponding to FIG. 1 are identified by the same reference numbers. In this illustrative embodiment, the inlets and outlets 22, 23, 24 are integrated into a base 36, which may be flange mounted on an adjoining component. A further difference from FIG. 1 is that the slide valve 17 is not snapped together with the support body 16, but rather is correspondingly connected to the housing body 12 by a connecting member 37. In this embodiment the connecting member 37 is made in one piece with the housing cover 12, but it is also conceivable to make the housing cover and connecting member as separate connectable parts.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A liquid filter comprising a filter housing, a filter element, a support body, and a slide valve; said filter housing comprising a housing body and a housing cover detachably connected to one another to form a seal and having an unfiltered liquid inlet, a filtered liquid outlet, and a filter outlet; said filter element being disposed in the filter housing and sealingly separating an unfiltered liquid area from a filtered liquid area and enclosing a filter interior space; said support body being positioned in said filter interior space; and said slide valve being detachably connected to the support body and selectively opening and closing the filter outlet; wherein the slide valve is attached to the housing body such that the slide valve is axially displaceable but is not non-destructively removable from the housing body, and wherein the slide valve is connected to the support body by a snap connection.

2. A liquid filter according to claim 1, wherein the support body is connected to the housing cover.

3. A liquid filter according claim 1, wherein the slide valve has a spherical head, which is axially connected to the support body by the snap connection.

4. A liquid filter comprising a filter housing, a filter element, a support body, and a slide valve; said filter housing comprising a housing body and a housing cover detachably connected to one another to form a seal and having an unfiltered liquid inlet, a filtered liquid outlet, and a filter outlet; said filter element being disposed in the filter housing and sealingly separating an unfiltered liquid area from a filtered liquid area and enclosing a filter interior space; said support body being positioned in said filter interior space; and said slide valve being detachably connected to the support body and selectively opening and closing the filter outlet; wherein the slide valve is attached to the housing body such that the slide valve is axially displaceable but is not non-destructively removable from the housing body, wherein the slide valve comprises a centering region, which is guided in the housing body, and wherein the centering region is guided in the housing body in such a way that the slide valve is held by a clamping force during filter replacement.

5. A liquid filter comprising a filter housing, a filter element, a support body, and a slide valve; said filter housing comprising a housing body and a housing cover detachably connected to one another to form a seal and having an unfiltered liquid inlet, a filtered liquid outlet, and a filter outlet; said filter element being disposed in the filter housing such that the filter element sealingly separates an unfiltered liquid area from a filtered liquid area and encloses a filter interior space; said support body being disposed in said filter interior space; and said slide valve selectively opening and closing the filter outlet and being detachably connected to a connecting member which in turn is connected to the housing cover, wherein said slide valve is attached to the housing body so that the slide valve is axially displaceable but is not non-destructively removable from the housing body, and wherein the slide valve is connected to the connecting member by a snap connection.

6. A liquid filter according to claim 5, wherein the slide valve has a spherical head, which is axially connected to the connecting member by the snap connection.

7. A liquid filter comprising a filter housing, a filter element, a support body, and a slide valve; said filter housing comprising a housing body and a housing cover detachably connected to one another to form a seal and having an unfiltered liquid inlet, a filtered liquid outlet, and a filter outlet; said filter element being disposed in the filter housing such that the filter element sealingly separates an unfiltered liquid area from a filtered liquid area and encloses a filter interior space; said support body being disposed in said filter interior space; and said slide valve selectively opening and closing the filter outlet and being detachably connected to a connecting member which in turn is connected to the housing cover, wherein said slide valve is attached to the housing body so that the slide valve is axially displaceable but is not non-destructively removable from the housing body, wherein the slide valve comprises a centering region, which is guided in the housing body, and wherein the centering region is guided in the housing body in such a way that the slide valve is held by a clamping force during filter replacement.

* * * * *